US009422199B2

(12) United States Patent
Tomala et al.

(10) Patent No.: US 9,422,199 B2
(45) Date of Patent: Aug. 23, 2016

(54) COMPOSITE REFRACTORY FOR AN INNER LINING OF A BLAST FURNACE

(71) Applicant: SGL CARBON SE, Wiesbaden (DE)

(72) Inventors: Janusz Tomala, Raciborz (PL); Chirstian Wiebel, Augsburg (DE); Frank Hiltmann, Kriftel (DE)

(73) Assignee: SGL Carbon SE, Wiesbaden (DE)

( * ) Notice: Subject to any disclaimer, the term of this patent is extended or adjusted under 35 U.S.C. 154(b) by 52 days.

(21) Appl. No.: 13/644,154

(22) Filed: Oct. 3, 2012

(65) Prior Publication Data

US 2013/0026686 A1 Jan. 31, 2013

(30) Foreign Application Priority Data

Jul. 11, 2011 (EP) .................................. 11173453

(51) Int. Cl.
| | | |
|---|---|---|
| C21B 7/06 | (2006.01) | |
| C04B 35/52 | (2006.01) | |
| C04B 35/532 | (2006.01) | |
| B32B 18/00 | (2006.01) | |
| F27B 1/14 | (2006.01) | |
| F27D 1/00 | (2006.01) | |

(52) U.S. Cl.
CPC ............. *C04B 35/522* (2013.01); *B32B 18/00* (2013.01); *C04B 35/532* (2013.01); *C21B 7/06* (2013.01); *F27B 1/14* (2013.01); *F27D 1/0006* (2013.01); *C04B 2235/3217* (2013.01); *C04B 2235/3232* (2013.01); *C04B 2235/3463* (2013.01); *C04B 2235/3804* (2013.01); *C04B 2235/3817* (2013.01); *C04B 2235/3852* (2013.01); *C04B 2235/425* (2013.01); *C04B 2235/428* (2013.01); *C04B 2235/6587* (2013.01); *C04B 2235/77* (2013.01); *C04B 2235/96* (2013.01); *C04B 2235/9607* (2013.01); *C04B 2237/363* (2013.01); *C04B 2237/365* (2013.01); *C04B 2237/704* (2013.01)

(58) Field of Classification Search
CPC ...................................................... F27D 1/0006
USPC .................... 266/280, 286, 196, 197; 52/596
See application file for complete search history.

(56) References Cited

U.S. PATENT DOCUMENTS

| | | | | |
|---|---|---|---|---|
| 1,439,410 A | * | 12/1922 | Gray .............................. 266/280 |
| 1,769,708 A | * | 7/1930 | Morgan .......................... 52/596 |
| 3,885,005 A | * | 5/1975 | Downing ................ B22F 3/222 |
| | | | | 264/125 |
| 4,130,438 A | * | 12/1978 | Watanabe et al. ............. 501/101 |
| 4,350,325 A | * | 9/1982 | LaBate .......................... 266/196 |
| 4,371,334 A | | 2/1983 | Van Laar |
| 4,552,800 A | * | 11/1985 | Blasch ..................... B22F 3/222 |
| | | | | 428/212 |
| 2002/0183189 A1 | * | 12/2002 | Ishii ....................... C04B 35/532 |
| | | | | 501/99 |
| 2005/0254543 A1 | | 11/2005 | Daimer |

FOREIGN PATENT DOCUMENTS

EP 0 040 440 B1 5/1984

* cited by examiner

*Primary Examiner* — Scott Kastler
(74) *Attorney, Agent, or Firm* — Laurence A. Greenberg; Werner H. Stemer; Ralph E. Locher (57) ABSTRACT

A refractory particularly for the use in an inner lining of a blast furnace is a layered composite comprising a protective layer and a conductive layer, wherein the interlayer bonding strength between the individual layers is more than 6 MPa.

34 Claims, 2 Drawing Sheets

COMPOSITE REFRACTORY FOR AN INNER LINING OF A BLAST FURNACE

CROSS-REFERENCE TO RELATED APPLICATION

This application is a continuation, under 35 U.S.C. §120, of copending international patent application No. PCT/EP2012/057341, which designated the United States; this application also claims the priority, under 35 U.S.C. §119, of European patent application No. EP 111 73 453.9, filed Jul. 11, 2011; the prior applications are herewith incorporated by reference in their entirety.

BACKGROUND OF THE INVENTION

Field of the Invention

The present invention relates to a refractory particularly for an inner lining of a blast furnace, to a blast furnace comprising an inner lining including such a refractory and to the use of such a refractory in an inner lining of a blast furnace.

Refractories are characterized in that they retain a high strength at high temperatures, such as at temperatures above 1000° C. Due to this, refractories are used in a plurality of applications, in which high thermal resistances are required, for example in linings of furnaces, kilns, incinerators and reactors, as a material for crucibles for melts or the like.

Refractories used in an inner lining of a blast furnace have, in particular to meet a plurality of demands, such as a high refractoriness, an adequate thermal conductivity with regard to the blast furnace design, a high mechanical strength including a high compressive strength at temperatures of up to 2000° C., an excellent wear resistance and a high oxidation resistance, because blast furnaces are always subject to thermal, chemical and mechanical wear during their lifetime. Finally, the lifetime of a blast furnace is determined by the resistance of its refractory with regard to thermal, chemical and mechanical wear. Also, a high resistance to dissolution in the liquid hot metal and slag is desirable for a refractory of an inner lining of a blast furnace. The aforementioned properties are especially important for refractories to be used in the hearth wall of a blast furnace, because it is exposed to the greatest stress from temperature factors, chemical attack and hot metal flow phenomena during its operation.

Modern refractories for an inner lining of a blast furnace are based on carbon and graphite materials, because of the high refractoriness and the satisfactory compressive strength of carbon and graphite at temperatures of up to 2000° C. These refractories are typically produced by forming a green block from a raw material mixture including carbonaceous material and thermally treating the green block at a temperature above 1000° C. However, standard carbon materials have the disadvantage of providing only a low wear resistance, particularly a low resistance to alkalis, a low resistance to oxidation, an insufficient resistance to dissolution of carbon material in the liquid hot metal and slag, which are not saturated with carbon, and a relatively high penetrability of liquid hot metal into their pores. In order to at least partially compensate or improve the aforementioned disadvantageous properties of carbon and graphite, specific additives are usually added to the carbon and graphite materials. For example, fine-powdered silicon is often added to such materials, because it causes a reduction of the pore diameter in the refractory—with the conversion to silicon carbide during thermal treatment—to such small values that the penetration of liquid hot metal into the refractory is reduced or even completely avoided. On the other hand, the addition of aluminum oxide increases the resistance of the material to dissolution of carbon in the liquid hot metal and slag.

In order to further improve the required properties and particularly the wear resistance of carbon based refractories, it has already been proposed to arrange a ceramic cup as a protective layer on one or more layers of carbon material. While the ceramic cup mainly has the function to impart the necessary wear resistance to the refractory, the carbon material effects the required thermal conductivity. For example, European patent EP 0 040 440 B1 discloses a bottom lining for a blast furnace, which comprises—from the bottom up—a thin layer of graphite, a layer of conventional carbon, a graphite layer, an intermediate layer of semi-graphite and a layer of firebrick having a high content of aluminum oxide. However, linings comprising ceramic cups have the disadvantage that the installation of the ceramic cup is expensive and labor intensive and thus further increases the down-time of the blast furnace during the installation and replacement of the inner lining.

Moreover, refractory blocks comprising two or more glued layers having different thermal conductivities and having different wear resistances are known. United States patent application publication No. US 2005/0254543 A1 for instance describes an inner lining of a carbothermic reduction furnace for the production of aluminum, which has a base layer of graphite and a ceramic coating layer of corundum glued thereto. While the upper ceramic layer imparts the necessary wear resistance to the refractory, the lower base layer of graphite imparts the required thermal conductivity to the refractory. However, also these refractories are expensive. More importantly, these refractories only provide a limited resistance particularly with regard to high temperatures due to the comparably weak bonding strength between the glued layers. On account of this comparably weak bonding strength and due to the different coefficients of thermal expansion of the individual layers, cracks are easily formed in the refractory blocks, particularly when they are subjected to high temperatures. Thus, generally an assembly of lining materials installed in a blast furnace by gluing or mechanical fastening elements has a comparably short lifetime.

SUMMARY OF THE INVENTION

It is accordingly an object of the invention to provide a composite refractory for an inner line of a blast furnace which overcomes the above-mentioned disadvantages of the heretofore-known devices and methods of this general type and which provides for a refractory, which overcomes the aforementioned disadvantages, i.e. which is cost-efficient, is easy to install, has a long lifetime and which has excellent mechanical and thermal properties that are required in particular for the use as an inner lining of a blast furnace. These properties shall include an adequate thermal conductivity, a high mechanical strength, an excellent oxidation resistance, an excellent wear resistance including a good resistance with regard to dissolution in the molten hot metal and slag and in particular an excellent resistance with regard to high temperatures.

With the foregoing and other objects in view there is provided, in accordance with the invention, a refractory, comprising:

a protective layer and a conductive layer together forming a layered composite refractory and configured with an interlayer bonding strength between the individual said layers of more than 6 MPa.

In other words, the above and other objects are achieved, in accordance with the invention, with a refractory particularly for the use in an inner lining of a blast furnace, wherein the refractory is a layered composite comprising a protective layer and a conductive layer, wherein the interlayer bonding strength between the individual layers is more than 6 MPa.

This solution is based on the surprising finding that a refractory in the form of a layered composite comprising a protective layer and a conductive layer, which are bonded together with a high bonding strength, namely with an interlayer bonding strength of more than 6 MPa—which is more than the bonding strength obtainable via gluing and/or mechanically fastening of the two layers—has an excellent mechanical and thermal stability and in particular an excellent resistance with regard to high temperatures even under the strong conditions present during the operation of a blast furnace. As set out in more detail below, this strong bonding between adjacent layers may be achieved by producing the composite with a method comprising a vibro-molding, block-pressing, uniaxial-pressing, isostatic-pressing or extrusion step. The excellent resistance of the refractory according to the present invention with regard to high temperatures is due to the fact that because of the firm bonding of the individual composite layers a delamination of the refractory is—in contrast to respective assemblies made of two or more glued and/or mechanically fastened layers—reliably avoided during the operation of the blast furnace, even when the refractory is subjected to a high temperature or to a rapid temperature change or at least a relatively rapid temperature change, for example during start-up of a blast furnace.

On account of this, the refractory according to the present invention has a very long lifetime.

Furthermore, the refractory according to the present invention allows to optimize both sides thereof concerning different properties, namely the side of the refractory which is oriented during the operation of the blast furnace to the iron melt, which is subsequently also referred to as the hot side or the protective side, concerning thermal, chemical and mechanical wear resistance as well as the opposite side of the refractory, which is subsequently also referred to as the cold side or the conductive side, with regard to heat flux.

Additionally or alternatively, the protective side may be optimized concerning its ability to support during the operation of the blast furnace natural skull formation, which is an iron-containing protection layer formed in-situ. Since the refractory according to the present invention combines different properties imparted by the protective layer and the conductive layer in a single composite, it can be easier and more cost-efficiently installed than conventional refractories comprising one layer of a carbonaceous material and a second, different layer of a ceramic material.

The term "interlayer bonding strength" as used in the context of the present invention refers to the flexural strength measured with a sample as described in the method ISO 12986-2 with the title "Carbonaceous materials used in the production of aluminum—Prebaked anodes and cathode blocks—Part 2: Determination of flexural strength by the four-point method", wherein the samples are prepared as follows: From the interlayer area of the refractory a cylindrical specimen with a diameter of 30 mm and a length of 110 mm is drilled. More specifically, the sample is prepared by core-drilling perpendicular or at least almost perpendicular through the interface plane, which is located between two adjacent layers of the refractory, so that the interface plane is in the middle or at least almost in the middle of the resulting core (cf. FIG. 3). The entire sample is treated before the measurement of the interlayer bonding strength to at least 1000° C., which is ensured in the usual production for such a refractory. The measurement of the interlayer bonding strength itself is then performed at room temperature, as described in the ISO 12986-2.

Moreover, the formulation "layered composite comprising a protective layer and a conductive layer" means that the composite, i.e. a single-piece assembly of at least two different materials, comprises at least two layers, namely at least one protective layer and at least one conductive layer, but may contain further layers, such as one or more intermediate layers, which are for instance arranged between the protective layer and the conductive layer, and/or a second protective layer and/or a second conductive layer. Independent of how many layers the layered composite comprises, all layers of the composite are bonded (in the case of an outer layer) to one adjacent layer or (in the case of an inner layer) to two adjacent layers, wherein the interlayer bonding strength between all two adjacent is more than 6 MPa in accordance with the present invention. In this connection it has to be noted that an intermediate layer is, according to the present invention, a layer which has a different composition than the adjacent layer(s). However, a mixing layer obtained during the manufacturing of the composite, for instance in a vibro-molding step, as a result of the interpenetration of small volumes of adjacent layers at the interface of these layers, is considered in the present patent application as boundary layer and thus not as an extra layer in addition to the adjacent layers.

As set out above, the interlayer bonding strength between all adjacent layers of the composite according to the present invention is more than 6 MPa. The higher the interlayer bonding strength between the individual layers of the manufacture, the higher is the resistance of the refractory with regard to high temperatures. Due to this, it is preferred that the interlayer bonding strength between all adjacent layers of the composite is as high as possible. For this reason, it is preferred that the interlayer bonding strength between the individual layers is at least 7 MPa, more preferably at least 7.5 MPa, even more preferably at least 8 MPa, particularly more preferably at least 8.5 MPa, yet more preferably at least 9 MPa, even more preferably at least 9.5 MPa and most preferably at least 10 MPa. Such strong bonding strengths can for instance be obtained by vibro-molding, block-pressing, uniaxial-pressing, isostatic-pressing or extrusion.

In the simplest case, which is particularly preferred, the refractory in accordance with the present invention consists solely of the protective layer and the conductive layer. Depending on the production method, between the protective layer and the conductive layer of this embodiment a mixing layer may be present, which is formed during the manufacturing of the composite for instance during a vibro-molding step as a result of the interpenetration of small volumes of the protective layer and the conductive layer. As set out above, such a mixing layer is not considered, in the present patent application, to be an extra layer, but rather to be a boundary layer. While the protective layer is preferably composed of a material, which is optimized with regard to the thermal, chemical and mechanical wear resistance and optionally further with regard to its ability to support the natural skull formation during the operation of the blast furnace, the conductive layer is preferably composed of a material, which is optimized with regard to heat flux. As set out in more detail below, the support of the natural skull formation may be achieved by providing a microporestructured protective layer containing one or more ceramics additives, preferably aluminum oxide and titanium dioxide.

According to an alternative embodiment of the present invention, the refractory may consist of an outer protective layer, an outer conductive layer and one or more intermediate layers arranged between the outer protective layer and the outer conductive layer. In principle it is also possible that above the protective layer a further, second protective layer is arranged and/or above the conductive layer a further, second conductive layer is arranged. However, this is not preferred under consideration of the cost aspect.

It is preferred that the flexural strength of at least one of the layers of the refractory is higher than the interlayer bonding strength. It is even more preferred that the flexural strengths of all layers of the refractory are higher than the interlayer bonding strength. If the refractory comprises more than two layers and thus two or more interfaces or boundary layers, respectively, preferably the flexural strength of at least one of the layers of the refractory and more preferably the flexural strengths of all of the layers of the refractory is/are higher than at least the lowest interlayer bonding strength. Thus, dependent from the interlayer bonding strength(s) the flexural strength of at least one of the layers of the composite and more preferably the flexural strengths of all the layers of the composite is/are more than 6 MPa, preferably at least 7 MPa, more preferably at least 7.5 MPa, even more preferably at least 8 MPa, particularly more preferably at least 8.5 MPa, yet more preferably at least 9 MPa, even more preferably at least 9.5 MPa and most preferably at least 10 MPa. The flexural strength of a layer is determined with the method described in ISO 12986-2, wherein the sample is prepared as follows: From the layer of the refractory a cylindrical specimen with a diameter of 30 mm and a length of 110 mm is drilled. More specifically, the sample is prepared by core-drilling perpendicular or at least almost perpendicular to the interface plane in the case the sample is taken from a composite according to the invention. Thus, a possible structural orientation of the core sample is the same as in the composite core sample. If the sample is taken from a comparative sample that consists of a single protective layer or a single conductive layer, the sample is prepared by core-drilling in a direction that corresponds to the direction of a composite sample so that a possible structural orientation of the core sample is the same as in the composite core sample.

The entire sample is treated before the measurement of the flexural strength to at least 1000° C., which is ensured in the usual production for such a refractory. The measurement of the flexural strength itself is then performed at room temperature, as described in the ISO 12986-2.

As set out above, the high interlayer bonding strength between the individual layers of the refractory of more than 6 MPa cannot be achieved by means of a glue and/or a mechanical fastening element, such as a screw, bolt or the like, in particular, when the refractory is subjected during its preparation to a heat treatment to a temperature above 1000° C. For this reason, it is not necessary that the refractory contains a glue and/or a mechanical fastening element and it is actually particularly preferred that the refractory according the present invention does not contain a glue and/or a mechanical fastening element at all.

In principle, the refractory may have any known three dimensional configuration. However, in order to be easily installable into a blast furnace it is preferred that the refractory has the form of a block, i.e. an at least substantially cuboidal configuration. The individual, adjacent layers of the block may be bonded together along their base surfaces or along their lateral surfaces. In the first mentioned case, the block has a sandwich-like design, whereas the block has in the latter mentioned case a shish kabob-like design. While the first mentioned configuration is particularly preferred for the use in the bottom lining of a blast furnace, the latter mentioned composite configuration is, in particular suitable for the use in the lining of the hearth-wall of a blast furnace.

According to a first preferred embodiment of the present invention, the refractory is a bilayer composite, i.e. it consists of the protective layer and the conductive layer, and has an at least substantially cuboidal configuration, wherein the protective layer and the conductive layer are bonded together along their base surfaces. In this embodiment, the thickness of the protective layer is preferably 10 to 50% of the total thickness of the refractory and the thickness of the conductive layer is preferably 50 to 90% of the total thickness of the refractory. Particularly, when the refractory is optimized with regard to the heat flux, it is preferred that the thickness of the protective layer amounts to 10 to 25% of the total thickness of the refractory and the thickness of the conductive layer is preferably 75 to 90% of the total thickness of the refractory. In contrast to this, it is preferred that the thickness of the protective layer amounts to 30 to 45% of the total thickness of the refractory and the thickness of the conductive layer is preferably 55 to 70% of the total thickness of the refractory, when the refractory is optimized with regard to the facilitation of skull formation. Naturally, the sum of the thickness of the protective layer and the thickness of the conductive layer amounts to 100%. With this embodiment, interlayer bonding strengths between the protective layer and the conductive layer of 8 to 9 MPa can easily be obtained by preparing this composite by vibromolding, block-pressing, uniaxial-pressing, isostatic-pressing or extrusion.

According to a second preferred embodiment of the present invention, the refractory is a bilayer composite, i.e. it consists of the protective layer and the conductive layer, and has an at least substantially cuboidal configuration, wherein the protective layer and the conductive layer are bonded together along their lateral surfaces. Also in this embodiment, the thickness of the protective layer is preferably 10 to 50% of the total thickness of the refractory and the thickness of the conductive layer is preferably 50 to 90% of the total thickness of the refractory. Again, when the refractory is optimized with regard to heat flux, it is preferred that the thickness of the protective layer amounts to 10 to 25% of the total thickness of the refractory and the thickness of the conductive layer is preferably 75 to 90% of the total thickness of the refractory. In contrast to this it is preferred that the thickness of the protective layer amounts to 30 to 45% of the total thickness of the refractory and the thickness of the conductive layer is preferably 55 to 70% of the total thickness of the refractory, when the refractory is optimized with regard to the facilitation of skull formation. The sum of the thickness of the protective layer and the thickness of the conductive layer also amounts to 100% in this embodiment. Interlayer bonding strengths between the protective layer and the conductive layer of 10 to 11 MPa can easily be obtained by preparing this composite by vibro-molding, block-pressing, uniaxial-pressing, isostatic-pressing or extrusion.

According to a third preferred embodiment of the present invention, the refractory consists of a protective layer, a conductive layer and one or more intermediate layers arranged between the protective layer and the conductive layer, wherein the refractory has an at least substantially cuboidal configuration, and wherein the protective layer, the conductive layer and the one or more intermediate layers are bonded together along their base surfaces. In this embodiment, the thickness of the protective layer is preferably 10 to 40%, the total thickness of all intermediate layers is preferably 5 to 25% and the thickness of the conductive layer is preferably 45 to 85% of the total thickness of the refractory. Naturally, the sum of the thickness of the protective layer and the thickness of the conductive layer also amounts to 100% in this embodiment. Moreover, such a composite may easily be obtained by vibro-molding, block-pressing, uniaxial-pressing, isostatic-pressing or extrusion.

According to a fourth preferred embodiment of the present invention, the refractory consists of a protective layer, a conductive layer and one or more intermediate layers arranged between the protective layer and the conductive layer, wherein the refractory has an at least substantially cuboidal configuration, and wherein the protective layer, the conductive layer and the one or more intermediate layers are bonded together along their lateral surfaces. In this embodiment, the thickness of the protective layer is preferably 10 to 40%, the total thickness of all intermediate layers is preferably 5 to 25% and the thickness of the conductive layer is preferably 45 to 85% of the total thickness of the refractory. Naturally, the sum of the thickness of the protective layer and the thickness of the conductive layer amounts also to 100% in this embodiment. Such a composite may also easily be obtained by vibro-molding, block-pressing, uniaxial-pressing, isostatic-pressing or extrusion.

As set out above, the conductive layer is preferably composed of a material, which is optimized with regard to heat flux, whereas the protective layer is preferably composed of a material, which is optimized with regard to the thermal, chemical and mechanical wear resistance and/or concerning its ability to support during the operation of the blast furnace natural skull formation. Due to this, it is preferred that the conductive layer has a higher thermal conductivity than the protective layer. Particularly good results are achieved, if the conductive layer has a thermal conductivity, at the operation temperature of e.g. 1500° C., which is at least 25%, preferably at least 50% and even more preferably at least 100% higher than the thermal conductivity of the protective layer. For example, the protective layer may have a thermal conductivity of at most 10 W/(m·K) at the operation temperature of e.g. 1500° C. and the conductive layer may have a thermal conductivity of at least 12.5 W/(m·K), more preferably of at least 15 W/(m·K) and most preferably of at least 20 W/(m·K).

In order to even improve the resistance of the refractory according to the present invention with regard to high temperatures, it is suggested according to a further preferred embodiment of the present invention that the difference between the thermal expansion coefficient of the conductive layer and the thermal expansion coefficient of the protective layer is as small as possible. Particularly good results are obtained when the difference between the thermal expansion coefficient of the conductive layer and the thermal expansion coefficient of the protective layer at temperatures between room temperature, i.e. 23° C., and the operation temperature of e.g. 1500° C. is as small as possible, preferably at all or at least at almost all temperatures between room temperature, i.e. 23° C., and the operation temperature of e.g. 1500° C. Particularly good results are obtained when the difference between the thermal expansion coefficient of the conductive layer and the thermal expansion coefficient of the protective layer at temperatures between room temperature, i.e. 23° C., and the operation temperature of e.g. 1500° C. is at most 0.6 µm/(K·m), preferably at most 0.4 µm/(K·m) and more preferably at most 0.2 µm/(K·m), respectively measured at the same temperature.

In principle, the refractory according to the present invention may be prepared by any process that results in a composite with adjacent layers or neighboring layers bonded to each other with an interlayer bonding strength of more than 6 MPa. By the way of example, the refractory is obtainable by a process including the following steps, and the refractory has the characteristics of a manufacture that has been prepared by the following:

a) providing a mixture for the protective layer, a mixture for the conductive layer and optionally a mixture for one or more intermediate layers;

b) forming a layered green block from the mixtures provided in step a); and     c) baking the green block of step b).

The forming of the green block in step b) can be performed by any method, where adjacent layers are bonded to one another with an interlayer bonding strength of more than 6 MPa, namely for instance by vibro-molding, block-pressing, uniaxial-pressing, isostatic-pressing or extrusion.

As set out above, the protective layer is preferably optimized with regard to its composition so that is has an excellent thermal, chemical and mechanical wear resistance and/or a high ability to support during the operation of the blast furnace natural skull formation. Thus, by the protective layer wear of the inner lining of a blast furnace can be greatly reduced especially during the initial operation of the blast furnace. The protective layer further prevents the dissolution of carbon in hot metal and the penetration of liquids into the open pore system of the refractory. Preferably, the mixture for the protective layer provided in step a) contains at least 20% by weight of a carbonaceous material, preferably calcined anthracite, and at least 3% by weight of silicon based on the dry aggregate of the mixture, as well as a binder. As an alternative to anthracite and preferably in addition to anthracite, one or more other carbonaceous materials may be added into the mixture. The addition of silicon causes a reduction of the pore diameter in the protective layer to such small values that the penetration of liquid hot metal into the protective layer is reduced or even completely prevented during the operation of the blast furnace. More specifically, the silicon leads to the formation of a microporous structure, which means that the cumulated porosity from pores with a diameter above 1 µm does not exceed 5% of the sample volume, which is usually measured by mercury porosimetry.

The binder added in step a) may be any binder known in this field, such as one selected from the group consisting of coal-tar pitch, petroleum pitch, phenolic resin, furfurylic resin, coal tar, petroleum tar and any mixture of two or more of the aforementioned compounds. The amount of the binder is preferably selected in such a manner that a workable paste is obtained, which means that a suitable viscosity of the paste for the forming process is obtained.

Moreover, it is preferred that the mixture for the protective layer provided in step a) further contains an oxidic ceramic, which is more preferably selected from the group consisting of aluminum oxide, titanium dioxide, aluminum silicate and mixtures of two or more of the aforementioned compounds. The addition of aluminum oxide increases the resistance of the material to dissolution in the liquid hot metal and slag. In order to obtain a high degree of this advantageous effect, it is preferred that the mixture for the protective layer provided in step a) comprises 6 to 14% by weight and more preferably 8 to 12% by weight of the oxidic ceramic based on the dry aggregate of the protective layer. Furthermore, the addition of aluminum silicate improves the resistance of the protective layer against hot metal.

In addition to this, the mixture for the protective layer provided in step a) may further contain a non-oxidic ceramic, in order to further improve the wear resistance of the protective layer. The non-oxidic ceramic may be selected from the group consisting of metal carbonitrides, metal carbides, metal borides, metal nitrides and mixtures of two or more of the aforementioned compounds. As a specific example, titanium diboride is mentioned.

In order to adjust the thermal conductivity, the mixture for the protective layer provided in step a) may further contain an appropriate amount of graphite.

Merely by way of example, the mixture for the protective layer provided in step a) may comprise:
a dry mixture of:
10 to 95% by weight of calcined anthracite optionally in admixture with another carbonaceous material,
3 to 20% by weight of silicon,
2 to 30% by weight of an oxidic ceramic selected from the group consisting of aluminum oxide, titanium dioxide, aluminum silicate and mixtures of two or more of the aforementioned compounds,
0 to 20% by weight of a non-oxidic ceramic and
0 to 30% by weight of synthetic or natural graphite or a mixture of the two;
and
at least one binder.

According to an even more preferred embodiment of the present invention, the mixture for the protective layer provided in step a) comprises:
a dry mixture of:
30 to 90% by weight of calcined anthracite optionally in admixture with another carbonaceous material,
5 to 15% by weight of silicon,
5 to 20% by weight of an oxidic ceramic selected from the group consisting of aluminum oxide, titanium dioxide, aluminum silicate and mixtures of two or more of the aforementioned compounds,
0 to 10% by weight of a non-oxidic ceramic and
0 to 30% by weight of synthetic or natural graphite or a mixture of both
and
at least one binder.

As further set out above, the conductive layer is preferably optimized with regard to its composition so that is has an excellent heat flux. Preferably, the mixture for the conductive layer provided in step a) contains at least 20% by weight of graphite based on the dry aggregate of the mixture, in order to adjust the required high thermal conductivity of the conductive layer, as well as a binder. As in the protective layer, the binder added to the mixture for the conductive layer in step a) may be any binder known in this field, such as one selected from the group consisting of coal-tar pitch, petroleum pitch, phenolic resin, furfurylic resin, coal tar, petroleum tar and any mixture of two or more of the aforementioned compounds. The amount of the binder is preferably selected in such a manner that a workable paste is obtained, which means that a suitable viscosity of the paste for the forming process is obtained.

Moreover, it is preferred that the mixture for the conductive layer provided in step a) further contains at least 10% by weight of a further carbonaceous material, preferably calcined anthracite.

In addition to this, the mixture for the conductive layer provided in step a) further contains an oxidic ceramic, which is preferably selected from the group consisting of aluminum oxide, titanium dioxide, aluminum silicate and mixtures of two or more of the aforementioned compounds. These ceramic materials have the same function as set out above with regard to the protective layer.

In a further preferred embodiment of the present invention, the mixture for the conductive layer provided in step a) further contains silicon.

Merely by way of example, the mixture for the conductive layer provided in step a) may comprise:
a dry mixture of:
20 to 80% by weight of synthetic or natural graphite or a mixture of both,
20 to 80% by weight of calcined anthracite optionally in admixture with another carbonaceous material,
0 to 20% by weight of silicon and
0 to 20% by weight of an oxidic ceramic selected from the group consisting of aluminum oxide, titanium dioxide, aluminum silicate and mixtures of two or more of the aforementioned compounds
and
at least one binder.

According to an even more preferred embodiment of the present invention, the mixture for the conductive layer provided in step a) comprises:
a dry mixture of:
30 to 70% by weight of synthetic or natural graphite or a mixture of both,
20 to 50% by weight of calcined anthracite optionally in admixture with another carbonaceous material,
5 to 15% by weight of silicon and
5 to 15% by weight of an oxidic ceramic selected from the group consisting of aluminum oxide, titanium dioxide, aluminum silicate and mixtures of two or more of the aforementioned compounds
and
at least one binder.

If the refractory contains one or more intermediate layers, the intermediate layer(s) may be composed as summarized above with regard to the protective layer or the conductive layer.

According to a further preferred embodiment of the present invention, in step c) the green block is baked at a temperature between 1100 and 1400° C., preferably between 1100 and 1300° C. and more preferably between 1150 and 1250° C.

According to another preferred embodiment of the present invention, the heat treated block may be impregnated after the baking according to step c) with an impregnation agent, such as for instance with coal tar, petroleum tar, coal-tar pitch, petroleum pitch, resin or the like, to fill the pores in order to increase the apparent density, the mechanical strength and the thermal conductivity of the final product. After the impregnation, the blocks are rebaked preferably at a temperature between 900 and 1300° C., more preferably at a temperature between 1000 and 1200° C. and even more preferably at a temperature between 1100 and 1200° C., in order to carbonize the impregnation agent. The impregnation and rebaking may be repeated several times.

Moreover, the present invention relates to a blast furnace comprising an inner lining, wherein the inner lining comprises at least one of the above described refractories.

With the above and other objects in view, there is also provided, in accordance with the invention, a refractory material and device in an inner lining of a blast furnace.

Other features which are considered as characteristic for the invention are set forth in the appended claims.

Although the invention is illustrated and described herein as embodied in a composite refractory for an inner lining of a blast furnace, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
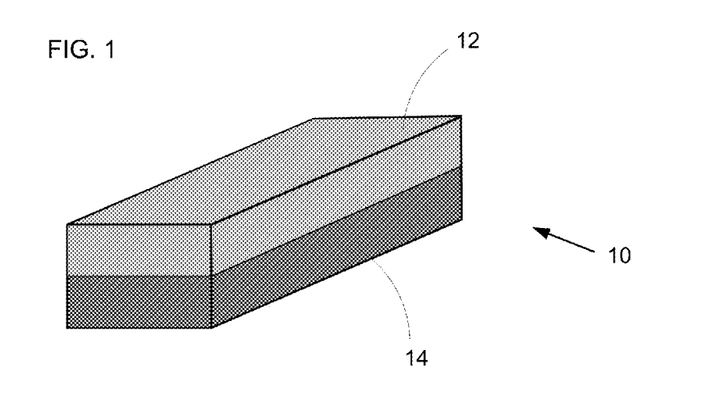
FIG. 1 shows a refractory in accordance with one embodiment of the present invention.
Figure 2:
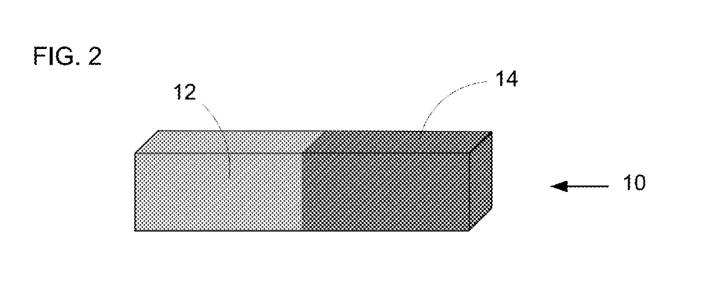
FIG. 2 shows a refractory in accordance with another embodiment of the present invention.

Referring now to the figures of the drawing in detail and first, particularly, to FIG. 1 thereof, there is shown a refractory 10, also referred to as refractory material or a refractory device, in the form of a bilayer composite comprising a protective layer 12 and a conductive layer 14 and has a cuboidal configuration. Both layers of the composite are bonded together along their base surfaces so that the composite has a sandwich-like design. In other words, the protective layer 12 is bonded on top of the conductive layer 14. The composite design is particularly preferred for the use of the refractory in the bottom lining of a blast furnace.

Also the refractory 10 shown in FIG. 1 is a bilayer composite with a cuboidal configuration comprising a protective layer 12 and a conductive layer 14. Both layers of the composite are bonded together along their base surfaces so that the composite has a shish-kabob-like design, that is, the two portions of the composite are placed back-to-back. A composite with this design is in particular suitable for the use of the refractory in the lining of the hearth-wall of a blast furnace. In other words, the protective layer 12 is bonded next to the conductive layer 14.

Figure 3:
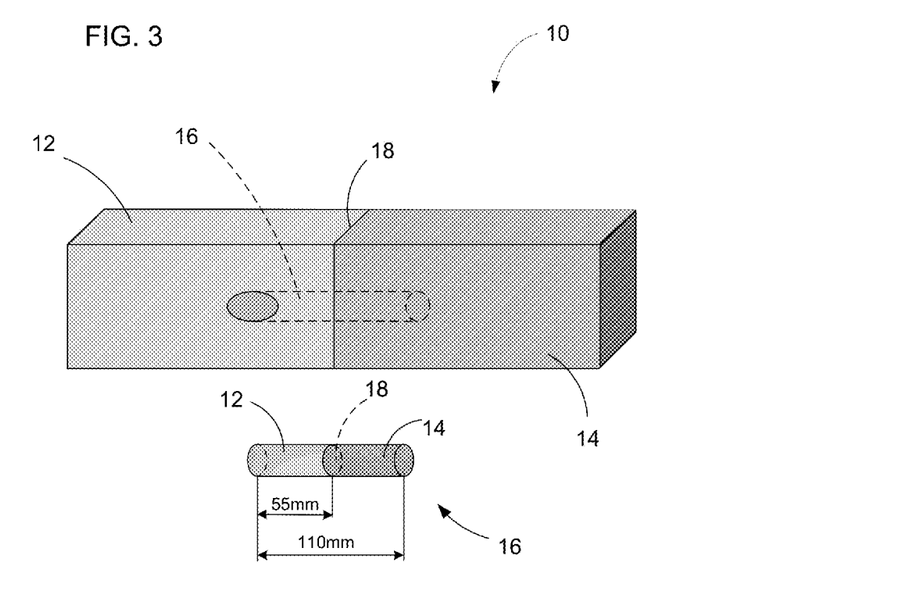
FIG. 3 shows schematically, how a sample for the measurement of the interlayer bonding strength according to the present invention is prepared.

FIG. 3 shows schematically, how a sample for the measurement of the interlayer bonding strength according to the method described in ISO 12986-2 is prepared according to the present invention. From the interlayer area of the refractory 10 a cylindrical specimen 16 with a diameter of 30 mm and a length of 110 mm is drilled. More specifically, the sample is prepared by core-drilling perpendicular or at least almost perpendicular through the interface plane 18, which is located between two adjacent layers 12, 14 of the refractory 10, so that the interface plane 18 is in the middle or at least almost in the middle of the resulting core 16. The measurement of the interlayer bonding strength itself is then performed at room temperature, as described in the ISO 12986-2.

In the following the present invention will be described in more detail by way of a non-limiting example.

Example 1

A bilayer refractory particularly optimized for excellent heat flux was prepared by preparing a mixture for the protective layer and a mixture for the conductive layer, wherein the mixture for the protective layer comprised:
 75 parts by weight of calcined anthracite,
 15 parts by weight of synthetic graphite,
 10 parts by weight of aluminum oxide and
 10 parts by weight of silicon;
 to this mixture coal-tar pitch was added as a binder in such an amount that a workable paste, i.e. a paste having a suitable viscosity for the forming process, was obtained, and the mixture for the conductive layer comprised:
 46 parts by weight of synthetic graphite,
 36 parts by weight of calcined anthracite,
 8 parts by weight of silicon and
 10 parts by weight of aluminum oxide;
 to this mixture coal-tar pitch was added as a binder in such an amount that a workable paste, i.e. a paste having a suitable viscosity for the forming process, was obtained.

The mixture for the protective layer and the mixture for the conductive layer were layered into a mold so that the height of the mixture for the protective layer amounted to about 40% by weight and the height of the mixture for the conductive layer amounted to about 60% by weight of the total height. Then, both mixtures were formed by vibromolding into green blocks having each a dimension of (W×H×L) 500×400×2500 mm, before the blocks were baked in a coke breeze packing at a maximum temperature of 1200° C.

The single layers of the blocks obtained with this method had the following properties:

Protective Layer:
 apparent density: 1.71 g/cm$^3$,
 cold crushing strength: 50 MPa,
 flexural strength: 12 MPa,
 thermal conductivity at 1500° C.: 12 W/m·K and
 pore size distribution: sum of open porosity from pores with a diameter of larger than 1 μm equaled 1.9% of the sample volume.

Conductive Layer:
 apparent density: 1.70 g/cm$^3$,
 cold crushing strength: 45 MPa,
 flexural strength: 11 MPa,
 thermal conductivity at 1500° C.: 23 W/m·K and
 pore size distribution: sum of open porosity from pores with a diameter of larger than 1 μm equaled 2.3% of the sample volume.

The interlayer bonding strength between the protective layer and the conductive layer determined as described above was 9 MPa.

Example 2

A bilayer refractory particularly optimized for facilitation of skull formation was prepared similar to the method described in example 1, except that the mixture for the skull formation protective layer comprised:
 45 parts by weight of calcined anthracite,
 30 parts by weight of synthetic graphite,
 10 parts by weight of silicon and
 10 parts by weight of aluminum oxide;
 to this mixture coal-tar pitch was added as a binder in such an amount that a workable paste, i.e. a paste having a suitable viscosity for the forming process, was obtained, and the mixture for the conductive layer comprised:

67 parts by weight of synthetic graphite,
15 parts by weight of calcined anthracite,
8 parts by weight of silicon and
10 parts by weight of aluminum oxide;
to this mixture coal-tar pitch was added as a binder in such an amount that a workable paste, i.e. a paste having a suitable viscosity for the forming process, was obtained.

The single layers of the blocks obtained with this method had the following properties:

Protective Layer:
apparent density: 1.72 g/cm$^3$,
cold crushing strength: 60 MPa,
flexural strength: 13 MPa
thermal conductivity at 1500° C.: 11 W/m·K and
pore size distribution: sum of open porosity from pores with a diameter of larger than 1 μm equaled 1.7% of the sample volume.

Conductive Layer:
apparent density: 1.71 g/cm$^3$,
cold crushing strength: 35 MPa,
flexural strength: 11 MPa,
thermal conductivity at 1500° C.: 30 W/m·K and
pore size distribution: sum of open porosity from pores with a diameter of larger than 1 μm equaled 3.5% of the sample volume.

The interlayer bonding strength between the protective layer and the conductive layer determined as described above was 8 MPa.

Comparative Example 1

A bilayer refractory was prepared by preparing a mixture for the protective layer and mixture for the conductive layer, wherein the mixture for the protective layer comprised:
75 parts by weight of calcined anthracite,
15 parts by weight synthetic graphite
10 parts by weight of aluminium oxide and
10 parts by weight of silicon;
to this mixture coal-tar pitch was added as a binder in such an amount that a workable paste, i.e. a paste having a suitable viscosity for the forming process, was obtained and the mixture for the conductive layer comprised:
36 parts by weight of calcined anthracite
46 parts by weight of synthetic graphite
8 parts by weight of silicon and
10 parts by weight of aluminium oxide;
to this mixture coal-tar pitch was added as a binder in such an amount that a workable paste, i.e. a paste having a suitable viscosity for the forming process, was obtained.

Than both mixtures were formed into individual green blocks with the following dimensions:
protective layer: 500×160×2500 mm and
conductive layer: 500×240×2500 mm.

These blocks were baked in a coke breeze packing and treated at a maximum temperature of 1200° C.

Afterwards the surfaces of the baked blocks were milled and both blocks were bonded together by their base surfaces by gluing these surfaces together making use of a phenolic resin. After curing the glue at 150° C., the glued block was heated up to 1000° C.

The so obtained block had similar properties as the block described in example 1 except that the interlayer bonding strength between the protective layer and the conductive layer was significantly smaller. More specifically, the interlayer bonding strength between the protective layer and the conductive layer determined as described above was less than 3 MPa.

Comparative Example 2

A bilayer refractory was prepared similar to the method described in comparative example 1, except that the block was only cured after the gluing at 150° C. without a subsequent heat treatment at 1000° C.

The interlayer bonding strength between the protective layer and the conductive layer determined as described above of the so obtained block was less than 5 MPa.

With this regard it has to be noted that the interlayer bonding strength of a bilayer block, wherein the two layers are bonded together by a glue, may be comparably high, when the block is not heat treated at high temperatures, such as at about 1000° C., which is required for the baking of a refractory. As shown by a comparison between comparative examples 1 and 2, the heat treatment at about 1000° C. leads to a significant reduction of the interlayer bonding strength of the gluing layer.

The following is a list of reference numerals used in the above-description of the drawing figures and their respective meanings:

10 Refractory
12 Protective layer
14 Conductive layer
16 Cylindrical specimen/Core
18 Interface plane

The invention claimed is:

1. A refractory, comprising:
   a protective layer and a conductive layer together forming a layered composite refractory and configured with an interlayer bonding strength between the individual said layers of more than 6 MPa;
   wherein said layered composite refractory does not contain a glue and/or a mechanical fastening element; and
   wherein a flexural strength of at least one of said layers or a flexural strength of all of said layers is greater than the interlayer bonding strength.

2. The refractory according to claim 1, wherein said interlayer bonding strength between the individual said layers is at least 7 MPa or greater.

3. The refractory according to claim 1, consisting of said protective layer and said conductive layer.

4. The refractory according to claim 1, consisting of said protective layer, said conductive layer, and one or more intermediate layers arranged between said protective layer and said conductive layer.

5. The refractory according to claim 1, formed in a body of an at least substantially cuboidal configuration, and wherein said layers are bonded together along base surfaces or lateral surfaces thereof.

6. The refractory according to claim 3, formed in a body with an at least substantially cuboidal configuration with said protective layer and said conductive layer bonded together along base surfaces thereof, and wherein a thickness of said protective layer is 10 to 25% or 30 to 45% of a total thickness of the refractory.

7. The refractory according to claim 3, formed in a body with an at least substantially cuboidal configuration, with said protective layer and said conductive layer bonded together along lateral surfaces thereof, and wherein a thickness of said protective layer is 10 to 25% of a total thickness of the refractory or 30 to 45% of the total thickness of the refractory.

8. The refractory according to claim 4, formed in a body of an at least substantially cuboidal configuration, with said protective layer, said conductive layer and said one or more intermediate layers bonded together along base surfaces thereof, and wherein a thickness of said protective layer is 10 to 40%, a total thickness of all intermediate layers is 5 to 25%, and a thickness of said conductive layer is 45 to 85% of a total thickness of the refractory.

9. The refractory according to claim 4, formed in a body of an at least substantially cuboidal configuration, with said protective layer, said conductive layer, and said one or more intermediate layers bonded together along lateral surfaces thereof, and wherein a thickness of said protective layer is 10 to 40%, a total thickness of all intermediate layers is 5 to 25%, and a thickness of said conductive layer is 45 to 85% of a total thickness of the refractory.

10. The refractory according to claim 1, wherein said conductive layer has a given thermal conductivity at 1500° C., and the thermal conductivity of said conductive layer is at least 25% or more greater than a thermal conductivity of said protective layer.

11. The refractory according to claim 1, wherein a difference between a thermal expansion coefficient of said conductive layer and a thermal expansion coefficient of said protective layer at a temperature between 23° C. and 1500° C. is at most 0.6 μm/(Km).

12. The refractory according to claim 1, having the characteristics of a refractory obtained by a process comprising the following steps:
   a) providing a mixture for the protective layer, a mixture for the conductive layer, and optionally a mixture for one or more intermediate layers;
   b) forming a layered green block from the mixtures provided in step a); and
   c) baking the green block of step b).

13. The refractory according to claim 12, wherein the forming step b) comprises a step selected from the group consisting of vibro-molding, block-pressing, uniaxial-pressing, and isostatic-pressing.

14. The refractory according to claim 12, wherein the mixture for the protective layer provided in step a) contains at least 20% by weight of a carbonaceous material and at least 3% by weight of silicon based on the dry aggregate of the mixture and a binder.

15. The refractory according to claim 14, wherein the carbonaceous material is calcined anthracite.

16. The refractory according to claim 14, wherein the mixture for the protective layer provided in step a) further contains an oxidic ceramic.

17. The refractory according to claim 16, wherein the oxidic ceramic is selected from the group consisting of aluminum oxide, titanium dioxide, aluminum silicate and mixtures of two or more of the aforementioned compounds.

18. The refractory according to claim 14, wherein the mixture for the protective layer provided in step a) further contains a non-oxidic ceramic.

19. The refractory according to claim 18, wherein the non-oxidic ceramic is selected from the group consisting of metal carbonitrides, metal carbides, metal borides, metal nitrides and mixtures of two or more of the aforementioned compounds.

20. The refractory according to claim 14, wherein the mixture for the protective layer provided in step a) further contains graphite.

21. The refractory according to claim 14, wherein the mixture for the protective layer provided in step a) contains a dry mixture of:
   10 to 95% by weight of calcined anthracite optionally in admixture with another carbonaceous material,
   3 to 20% by weight of silicon,
   2 to 30% by weight of an oxidic ceramic selected from the group consisting of aluminum oxide, titanium dioxide, aluminum silicate and mixtures of two or more of the aforementioned compounds,
   0 to 20% by weight of a non-oxidic ceramic and
   0 to 30% by weight of synthetic or natural graphite or a mixture of both and
   at least one binder.

22. The refractory according to claim 15, wherein the mixture for the conductive layer provided in step a) contains at least 20% by weight of synthetic graphite or natural graphite or a mixture thereof based on the dry aggregate of the mixture and a binder.

23. The refractory according to claim 22, wherein the mixture for the conductive layer further contains at least 10% by weight of a further carbonaceous material.

24. The refractory according to claim 22, wherein the mixture for the conductive layer further contains an oxidic ceramic.

25. The refractory according to claim 24, wherein the oxidic ceramic is selected from the group consisting of aluminum oxide, titanium dioxide, aluminum silicate and mixtures of two or more of the aforementioned compounds.

26. The refractory according to claim 22, wherein the mixture for the conductive layer provided in step a) further contains silicon.

27. The refractory according to claim 22, wherein the mixture for the conductive layer provided in step a) contains a dry mixture of:
   20 to 80% by weight of synthetic or natural graphite or a mixture of both,
   20 to 80% by weight of calcined anthracite optionally in admixture with another carbonaceous material,
   0 to 20% by weight of silicon and
   0 to 20% by weight of an oxidic ceramic selected from the group consisting of aluminum oxide, titanium dioxide, aluminum silicate and mixtures of two or more of the aforementioned compounds
   and
   at least one binder.

28. The refractory according to claim 12, wherein in step c) the green block is baked at a temperature between 1100 and 1400° C.

29. The refractory according to claim 28, wherein the block is impregnated after the baking according to step c) with an impregnation agent, and wherein the impregnated green block is rebaked at a temperature between 900 and 1300° C.

30. A blast furnace, comprising an inner lining formed with at least one refractory according to claim 1.

31. An inner lining of a blast furnace, comprising a plurality of refractories according to claim 1 disposed to form the inner lining of the blast furnace.

32. A refractory, comprising:
   a protective layer and a conductive layer together forming a layered composite refractory and configured with an interlayer bonding strength between the individual said layers of more than 6 MPa;
   wherein a flexural strength of at least one of said layers or a flexural strength of all of said layers is greater than the interlayer bonding strength;
   the refractory having the characteristics of a refractory obtained by a process comprising the following steps:

a) providing a mixture for the protective layer, a mixture for the conductive layer, and optionally a mixture for one or more intermediate layers;
b) forming a layered green block from the mixtures provided in step a); and
c) baking the green block of step b); and
wherein the mixture for the protective layer provided in step a) contains at least 20% by weight of a carbonaceous material, at least 3% by weight of silicon based on the dry aggregate of the mixture, a binder, and an oxidic and a ceramic.

33. A refractory, comprising:
a protective layer and a conductive layer together forming a layered composite refractory and configured with an interlayer bonding strength between the individual said layers of more than 6 MPa;
wherein a flexural strength of at least one of said layers or a flexural strength of all of said layers is greater than the interlayer bonding strength;
the refractory having the characteristics of a refractory obtained by a process comprising the following steps:
a) providing a mixture for the protective layer, a mixture for the conductive layer, and optionally a mixture for one or more intermediate layers;
b) forming a layered green block from the mixtures provided in step a); and
c) baking the green block of step b);
the mixture for the protective layer provided in step a) containing a dry mixture of:
10 to 95% by weight of calcined anthracite optionally in admixture with another carbonaceous material,
3 to 20% by weight of silicon,
2 to 30% by weight of an oxidic ceramic selected from the group consisting of aluminum oxide, titanium dioxide, aluminum silicate and mixtures of two or more of the aforementioned compounds;
an optional amount of 0 to 20% by weight of a non-oxidic ceramic; and
an optional amount of 0 to 30% by weight of synthetic or natural graphite or a mixture of both;
and a binder.

34. The refractory according to claim 1, wherein each of said protective layer and said conductive layer is based on a carbonaceous material.

* * * * *